US012463738B2

United States Patent
Imlau

(10) Patent No.: US 12,463,738 B2
(45) Date of Patent: Nov. 4, 2025

(54) METHOD FOR INITIALIZING A SELF-SYNCHRONIZING cnPRTC MESH

(71) Applicant: Deutsche Telekom AG, Bonn (DE)

(72) Inventor: Helmut Imlau, Langwedel (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/866,088

(22) PCT Filed: May 22, 2023

(86) PCT No.: PCT/EP2023/063667
§ 371 (c)(1),
(2) Date: Nov. 15, 2024

(87) PCT Pub. No.: WO2023/232543
PCT Pub. Date: Dec. 7, 2023

(65) Prior Publication Data
US 2025/0175277 A1   May 29, 2025

(30) Foreign Application Priority Data
Jun. 1, 2022 (EP) .................................. 22176871

(51) Int. Cl.
*H04J 3/06* (2006.01)
(52) U.S. Cl.
CPC .......... *H04J 3/0635* (2013.01); *H04J 3/0667* (2013.01)
(58) Field of Classification Search
CPC ...... H04J 3/0617; H04J 3/0635; H04J 3/0658; H04J 3/0667; H04J 3/0685; H04J 3/0697
See application file for complete search history.

(56) References Cited

U.S. PATENT DOCUMENTS 9,474,009 B2 * 10/2016 Deenoo ................... H04L 41/12
10,455,350 B2 * 10/2019 Kratz ....................... H04L 67/53
(Continued)

OTHER PUBLICATIONS

Imlau Helmut, "Backup for GNSS based Timing and Synchronization: ITU-T specified coherent network Primary Reference Clock (cnPRTC) architecture", Jul. 15, 2019 (Jul. 15, 2019), pp. 1-4, Retrieved from the Internet: URL:http://www.linkedin.com/pulse/backup-gnss-based-timing-synchronization-itu-t-specified-helmut-imlau-?trk=read_related_article-card_title XP055980231 [retrieved on Nov. 11, 2022].

(Continued)

*Primary Examiner* — Alpus Hsu
(74) *Attorney, Agent, or Firm* — LEYDIG, VOIT & MAYER, LTD.

(57) ABSTRACT

A method for initializing a self-synchronizing coherent network Primary Reference Time Clock (cnPRTC) mesh includes: a self-synchronizing cnPRTC mesh is initialized during a start-up period; and a Universal Time Coordinated (UTC(k)) node connected to a selected cnPRTC node of the self-synchronizing cnPRTC mesh sets the selected cnPRTC node to a UTC(k) time provided by the UTC(k) node during the start-up period when a Global Navigation Satellite System (GNSS) system fails to provide the selected cnPRTC node with a GNSS time during the start-up period, wherein setting the selected cnPRTC node comprises directly inserting the UTC(k) time into a clock combiner module of the selected cnPRTC node, the inserted UTC(k) time replacing weighted times provided to the selected cnPRTC node by local time sources and remote time sources.

13 Claims, 2 Drawing Sheets

| | | | | | | |
|---|---|---|---|---|---|---|
| 2 | UTC(k) node | 10 | cnPRTC node | 101 | UTC(k) insertion function |
| 3 | GNSS system | 100 | clock combiner | 102 | agreement algorithm |
| 108 | local time source | 105 | output | 103 | timescale algorithm |
| 1080 | PRTC(GNSS) | 106 | measurement & fault detection | 104 | coordination function |
| 1081 | ePRTC | 107 | GNSS-CV | 1000 | time signal |
| 109 | remote time source | | | 1001 | time |
| 1091/11 | ePRTC of neighboring cnPRTC node | | | 1002 | phase |
| | | | | 1003 | frequency |

(56) References Cited

U.S. PATENT DOCUMENTS

| | | | |
|---|---|---|---|
| 10,564,309 B2* | 2/2020 | Aldridge | G01V 3/165 |
| 10,681,500 B2* | 6/2020 | Kratz | H04L 67/53 |
| 10,911,211 B1* | 2/2021 | Kratz | H04B 17/21 |
| 2021/0156529 A1* | 5/2021 | Selevan | F21L 2/00 |
| 2022/0303929 A1* | 9/2022 | Chowdhury | H03L 7/18 |

OTHER PUBLICATIONS

Sliwczynski Lukasz et al, "Fiber-Based UTC Dissemination Supporting 5G Telecommunications Networks", Apr. 20, 2020 (Apr. 20, 2020), vol. {0} 58, No. {0} 4, p. 67-73, XP011784062 [retrieved on Apr. 17, 2020] DOI. 10.1109/MCOM.001.190 ISSN:0163-6804.

Helmut Imlau, "ePRTC synchronized by BIPM registered UTC Time Laboratories; WD31", Deutsche Telekom, ITU-T Draft; Study Period 2013-2016, International Telecommunication Union, Geneva; CH, vol. {0} 13/15, Sep. 2, 2015 (Sep. 2, 2015), p. 1, XP044148398.

* cited by examiner

| | |
|---|---|
| 1 | cnPRTC mesh |
| 2 | UTC(k) node |
| 10, 11 | cnPRTC nodes |
| 20 | OTT time distribution node |
| 21 | glass fiber |

METHOD FOR INITIALIZING A SELF-SYNCHRONIZING cnPRTC MESH

CROSS-REFERENCE TO PRIOR APPLICATIONS

This application is a U.S. National Phase application under 35 U.S.C. § 371 of International Application No. PCT/EP2023/063667, filed on May 22, 2023, and claims benefit to European Patent Application No. EP 22176871.6, filed on Jun. 1, 2022. The International Application was published in English on Dec. 7, 2023 as WO 2023/232543 A1 under PCT Article 21(2).

FIELD

The invention relates to a method for initializing a self-synchronizing coherent network Primary Reference Time Clock (cnPRTC) mesh, wherein a self-synchronizing cnPRTC mesh is initialized during a start-up period. The invention further relates to a cnPRTC node for a self-synchronizing cnPRTC mesh, a self-synchronizing cnPRTC mesh and a system for initializing a self-synchronizing cnPRTC mesh.

BACKGROUND

The self-synchronizing cnPRTC (coherent network Primary Reference Time Clock) mesh specified by ITU (International Telecommunication Unit)-T (Telecommunication Standardization Sector) under G.8275 comprises a plurality of cnPRTC nodes which are connected to each other via glass fibers and are configured for self-synchronizing optically and providing a highly accurate and available (24 hours/7 days) standard time, i.e. a highly accurate, highly available and UTC (Universal Time Coordinated)-related time based on a GNSS (Global Navigation Satellite System) time. The highly accurate and available standard time is required by latest generations of cellular networks, particularly 5G (fifth generation) and more advanced cellular networks, e.g. for a Time Division Duplex (TDD) operation of the cellular network.

Each cnPRTC node receives a GNSS time signal provided by a local GNSS receiver wherein GNSS may be configured as NAVSTAR GPS, Galileo, GLONASS and/or Beidou provided and operated by US, European Union, Russia and China, respectively.

During a normal operation the self-synchronizing cnPRTC mesh withstands a temporary failure of the GNSS, e.g. a GNSS time signal, GNSS time in short, is unavailable or at least inaccurate for one or more weeks (hold-over time), without substantially affecting an accuracy of the provided standard time.

However, during a start-up period, the self-synchronizing cnPRTC mesh relies on a continuous full availability of the GNSS. Each start-up period of the self-synchronizing cnPRTC may last a plurality of weeks up to several months.

In view of actual and future political, economic and military conflicts and a GNSS jamming terrorism growing world-wide, the continuous availability of the GNSS is increasingly threatened. Accordingly, a necessary initialization of the self-synchronizing cnPRTC mesh might be impossible or at least adversely affected.

SUMMARY

In an exemplary embodiment, the present invention provides a method for initializing a self-synchronizing coherent network Primary Reference Time Clock (cnPRTC) mesh. The method includes: a self-synchronizing cnPRTC mesh is initialized during a start-up period; and a Universal Time Coordinated (UTC(k)) node connected to a selected cnPRTC node of the self-synchronizing cnPRTC mesh sets the selected cnPRTC node to a UTC(k) time provided by the UTC(k) node during the start-up period when a Global Navigation Satellite System (GNSS) system fails to provide the selected cnPRTC node with a GNSS time during the start-up period, wherein setting the selected cnPRTC node comprises directly inserting the UTC(k) time into a clock combiner module of the selected cnPRTC node, the inserted UTC(k) time replacing weighted times provided to the selected cnPRTC node by local time sources and remote time sources.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
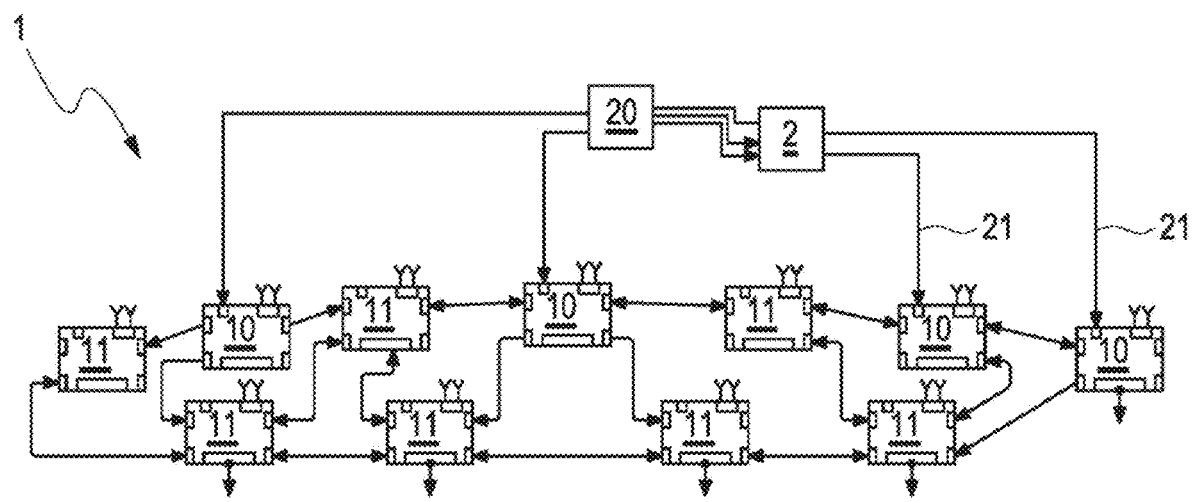
FIG. 1 schematically shows a structural diagram of a self-synchronizing cnPRTC mesh according to an embodiment of the invention.

Exemplary embodiments of the invention provide a method for initializing a self-synchronizing cnPRTC mesh which does not rely on an availability of a GNSS time signal. Further exemplary embodiments of the invention provide a cnPRTC node for a self-synchronizing cnPRTC mesh, a self-synchronizing cnPRTC mesh, and a system for initializing a self-synchronizing cnPRTC mesh.

A first aspect of the invention provides a method for initializing a self-synchronizing cnPRTC mesh, wherein a self-synchronizing cnPRTC mesh is initialized during a start-up period. During the start-up period, the cnPRTC nodes of the cnPRTC mesh gradually synchronize themselves by communicating via glass fibers connecting neighboring cnPRTC nodes. The G.8275 specification requires the self-synchronization of the cnPRTC nodes to rely on a GNSS time available permanently during the start-up period.

According to the invention, a UTC(k) node connected to a selected cnPRTC node of the self-synchronizing cnPRTC mesh sets the selected cnPRTC node to a UTC(k) time provided by the UTC(k) node during the start-up period when the GNSS fails to provide the selected cnPRTC node with a GNSS time during the start-up period. The UTC(k) node is a time standard provided and operated by a national laboratory k, e.g. the node UTC (DTAG) is a time standard provided and operated by Deutsche Telekom AG and located at Frankfurt, based on Cesium atomic clocks. UTC(k) nodes are registered with the International Bureau of Weights and Measures (BIPM). The UTC(k) time is a time signal provided by the UTC(k) node.

In other words, the UTC(k) node bypasses the failing GNSS. As a result, a robustness of the initialization method of the self-synchronizing cnPRTC mesh is substantially increased.

It is noted that a 24/7 availability of a UTC(k) node is hardly achieved due to a scientific nature of most UTC(k) nodes. However, a UTC(k) node may be continuously operated up to several months for completely covering the start-up period of the cnPRTC mesh.

It is further noted that UTC(k) nodes, during a normal operation of the self-synchronizing cnPRTC mesh, may be also used for supervising the self-synchronizing cnPRTC mesh, i.e. for measuring a time signal provided by the self-synchronizing cnPRTC mesh.

Preferably, setting the selected cnPRTC node comprises directly inserting the UTC(k) time into a clock combiner module of the selected cnPRTC node. The clock combiner module of the cnPRTC node implements an agreement algorithm, a timescale algorithm and a coordination function and is configured for receiving a plurality of local time sources, i.e. time signals provided locally, and remote time sources, i.e. time signals provided remotely, from measurement and fault detection module of the selected cnPRTC node, weightedly combining the received time signals and generating a time signal to be output during a normal operation of the cnPRTC node, the time signal comprising a time, a phase and a frequency. The clock combiner module additionally directly receives and takes into account the inserted UTC(k) time.

A UTC(k) insertion function of the clock combiner module may receive the inserted UTC(k) time. The clock combiner module of the cnPRTC node implements the UTC(k) insertion function. The UTC(k) insertion function may comprise a UTC(k) interface and is configured for directly receive the UTC(k) time from the UTC(k) node via the UTC(k) interface and to cooperate with the agreement algorithm, the timescale algorithm and the coordination function.

Advantageously, the inserted UTC(k) time replaces weighted times provided to the selected cnPRTC node by local time sources and remote time sources. During the start-up period, the generated time, phase and frequency are overruled by a time, phase and frequency provided by the UTC(k) node, i.e. the time, phase and frequency generated from other time sources by the clock combiner module are ignored. In other words, the selected cnPRTC node is operated in a "UTC(k) only" mode.

In an embodiment, the UTC(k) time is inserted via a dedicated glass fiber. The dedicated glass fiber allows for a highly accurate time transfer from the UTC(k) node to the selected cnPRTC node.

In another embodiment, the UTC(k) time is inserted using a pair of dedicated wave lengths. The pair of dedicated wave lengths allows for a highly accurate time transfer from the UTC(k) node to the selected cnPRTC node.

The UTC(k) time may be inserted as a 1 pps signal, a 10 MHz signal, a ToD signal and/or a PTP signal. The UTC(k) interface of the UTC(k) insertion function is implemented according to G.703 and allows for receiving the 1 pps (pulse per second) signal, the ToD (Time of Day) signal and/or the PTP (Precision Time Protocol) signal.

The self-synchronizing cnPRTC mesh is advantageously initialized during a plurality of weeks/months as the start-up period. A length of the start-up period relying on the UTC(k) node substantially corresponds to the length of the start-up period relying on the GNSS. Using the UTC(k) is not detrimental for the initialization of the cnPRTC mesh with respect to a length of the start-up period.

Preferably, the cnPRTC node is selected dependent on a spatial distance from the UTC(k) node, an availability of a glass fiber from the UTC(k) node to the selected cnPRTC node and/or an availability of a pair of dedicated wave lengths. The UTC(k) node shall possibly be local to the selected cnPRTC node and an existing glass fiber connecting the selected cnPRTC node and the UTC(k) node shall possibly be used. Selecting the cnPRTC node close to the UTC(k) node and/or having a glass fiber connection to the UTC(k) node facilitates an implementation of the inventive method.

In favorable embodiments, the UTC(k) node provides a plurality of selected cnPRTC nodes of the self-synchronizing cnPRTC mesh with the UTC(k) time. The UTC(k) is plurally inserted into the self-synchronizing cnPRTC mesh. The failure of the GNSS is compensated at a plurality of nodes of the self-synchronizing cnPRTC mesh allowing for a fast and stable propagation of the UTC(k) time within the self-synchronizing cnPRTC mesh.

The selected cnPRTC node may synchronize a neighboring cnPRTC node not participating in the method. The initial self-synchronization of the self-synchronizing cnPRTC mesh relying on the UTC(k) node substantially corresponds to the self-synchronization of the self-synchronizing cnPRTC mesh relying on the GNSS. It will be appreciated that the selected cnPRTC node may synchronize each neighboring cnPRTC node, i.e., a plurality of neighboring cnPRTC nodes.

A second aspect of the invention provides a cnPRTC node for a self-synchronizing cnPRTC mesh. The cnPRTC node is configured for cooperating with neighboring cnPRTC nodes of the self-synchronizing cnPRTC mesh as specified by G.8275.

According to the invention, the cnPRTC node is configured for participating in a method according to an embodiment of the invention. The cnPRTC node allows for inserting a UTC(k) time provided by a UTC(k) node. The inserted UTC(k) time allows for compensating a missing or inaccurate GNSS time during a start-up period of the self-synchronizing cnPRTC mesh. The cnPRTC node allows for an increased robustness of the initialization method of the self-synchronizing cnPRTC mesh.

A third aspect of the invention provides a self-synchronizing cnPRTC mesh, comprising a plurality of cnPRTC nodes. The self-synchronizing cnPRTC mesh is configured as specified by G.8275.

According to the invention, the self-synchronizing cnPRTC mesh comprises at least one cnPRTC node according to an embodiment of the invention. The at least one cnPRTC node allows for an increased robustness of the initialization method of the self-synchronizing cnPRTC mesh.

A fourth aspect of the invention is a system for initializing a self-synchronizing cnPRTC mesh, comprising a cnPRTC node.

According to the invention, the system comprises a UTC (k) node connected to the cnPRTC node wherein the cnPRTC node is configured according to an embodiment of the invention. The UTC(k) time provided by the UTC(k) node compensates a missing or inaccurate GNSS time during a start-up period of the self-synchronizing cnPRTC mesh. The system allows for an increased robustness of the initialization of the self-synchronizing cnPRTC mesh with respect to an availability or accuracy of the GNSS.

Preferably, the UTC(k) node is connected to a plurality of cnPRTC nodes according to the invention. The UTC(k) node may be connected to a cnPRTC node via an OTT (Optical Time Transfer) time distribution node. The OTT time distribution node is an exemplary entity for providing a high accurate distribution of time signals and may be used for sending a UTC(k) time signal from a UTC(k) node to a cnPRTC node with an appropriate performance.

The plurality of cnPRTC nodes connected to the UTC(k) node allow for a fast and stable propagation of the UTC(k) time within the self-synchronizing cnPRTC mesh.

Exemplary embodiments of the invention provide that an initialization of the self-synchronizing cnPRTC is independent of an availability and/or accuracy of the GNSS. Implementing exemplary embodiments of the inventive method utilizes only slight modifications of selected cnPRTC nodes of the self-synchronizing cnPRTC mesh.

It shall be understood that the features described previously and to be described subsequently may be used not only in the indicated combinations but also in different combinations or on their own without leaving the scope of the present invention.

FIG. 1 schematically shows a structural diagram of a self-synchronizing cnPRTC mesh 1 according to an embodiment of the invention. The self-synchronizing cnPRTC mesh 1 comprises a plurality of cnPRTC nodes 10, 11. A plurality of cnPRTC nodes 10, particularly four cnPRTC nodes 10, is respectively connected to a UTC(k) node 2 directly via a glass fiber 21 or indirectly via an OTT (Optical Time Transfer) time distribution node 20 connected to the UTC(k) node 2. The OTT time distribution node 20 is not limiting. Alternative time transfer entities providing a performance appropriate for transferring UTC(k) time signals may be equally applied. It will be appreciated that the shown constellation is exemplary concerning a number of cnPRTC nodes 10, 11, glass fibers 21 and OTT time distribution nodes 20 and does not limit the invention.

The plurality of cnPRTC nodes 10 and the UTC(k) node 2 connected directly or indirectly to the plurality cnPRTC nodes 10 form a system for initializing the self-synchronizing cnPRTC mesh 1.

Each cnPRTC node 10 is a cnPRTC node according to an embodiment of the invention for the self-synchronizing cnPRTC mesh 1.

Figure 2:
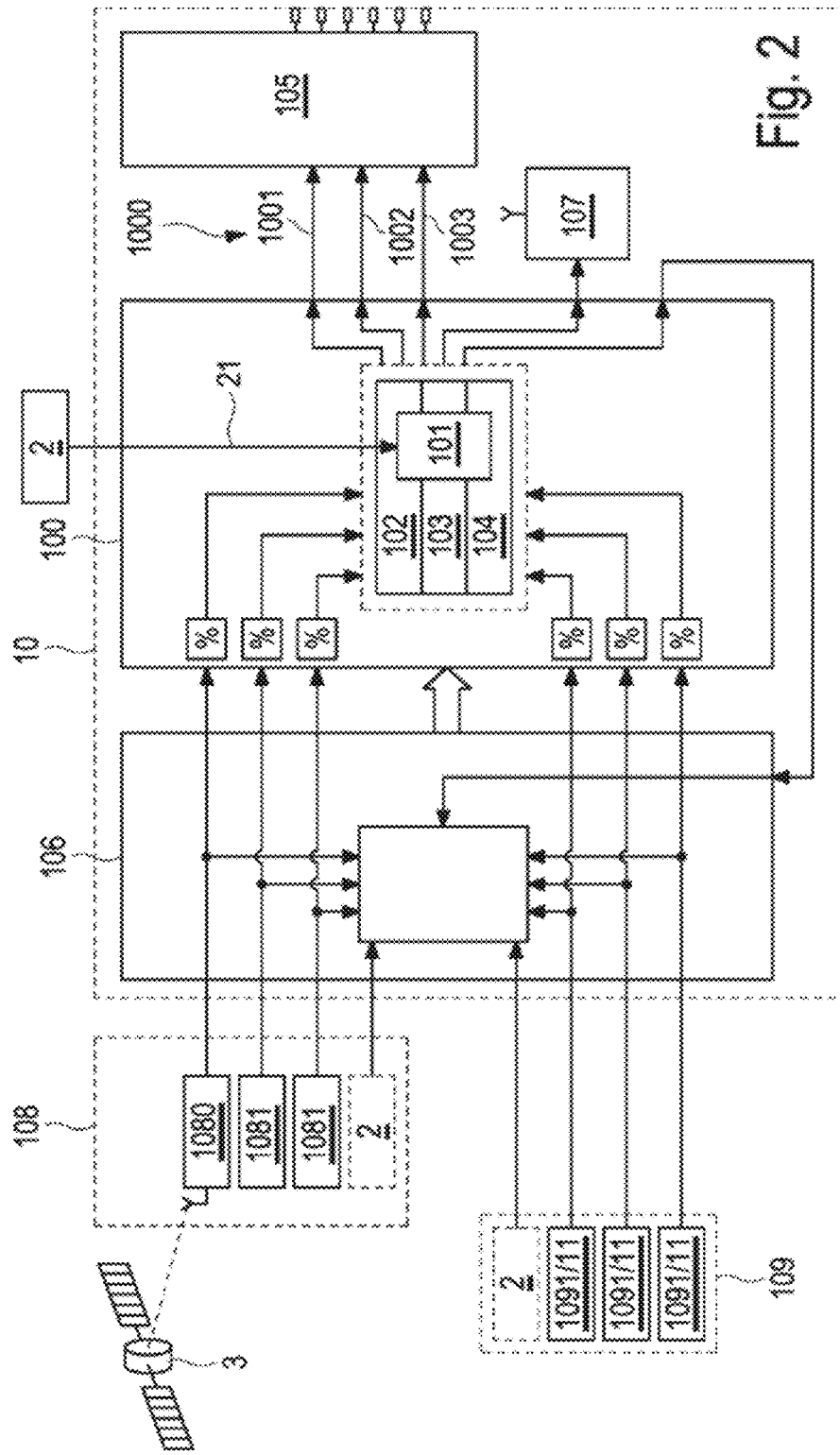
FIG. 2 schematically shows a structural diagram of a cnPRTC node according to an embodiment of the invention.

FIG. 2 schematically shows a structural diagram of a cnPRTC node 10 according to an embodiment of the invention. The cnPRTC node 10 may comprise a clock combiner module 100 which may comprise a UTC(k) insertion function 101 and be configured for generating a time signal 1000 comprising a time 1001, a phase 1002 and a frequency 1003. The clock combiner module 100 may further comprise an agreement algorithm 102, a timescale algorithm 103 and a coordination function 104.

The UTC(k) node 10 may further comprise an output module 105, a measurement and fault detection module 106 and a GNSS-CV (Common View) module 107.

Each cnPRTC node 10 is configured for participating in a method according to an embodiment of the invention as follows for initializing the self-synchronizing cnPRTC mesh 1.

The self-synchronizing cnPRTC mesh 1 is initialized during a start-up period. The self-synchronizing cnPRTC mesh 1 may be initialized during a plurality of weeks/months as the start-up period.

The UTC(k) node 2 connected to the selected cnPRTC nodes 10 of the self-synchronizing cnPRTC mesh 1 sets the selected cnPRTC node 10 to a UTC(k) time provided by the UTC(k) node 2 during the start-up period when a GNSS system 3 fails to provide the selected cnPRTC node 10 with a GNSS time during the start-up period. Each cnPRTC node 10 is selected dependent on a spatial distance from the UTC(k) node 2 and/or an availability of a glass fiber 21 from the UTC(k) node 2 to the selected cnPRTC node 10. The UTC(k) node 2 sets the plurality of selected cnPRTC nodes 10 of the self-synchronizing cnPRTC mesh 1 to the UTC(k) time.

Setting the selected cnPRTC node 10 comprises directly inserting the UTC(k) time into the clock combiner module 100 of the selected cnPRTC node 10. The UTC(k) insertion function 101 of the clock combiner module 100 may receive the inserted UTC(k) time. The inserted UTC(k) time favorably replaces weighted times provided to the selected cnPRTC node 10 by local time sources 108 and remote time sources 109. The local sources 108 may comprise a PRTC (GNSS) 1080, two ePRC (enhanced Primary Reference Clock, according to G 811.1) 1081 and the UTC(k) node 2, the latter for measuring only. The remote sources 109 may comprise a plurality of ePRTC 1091 and/or neighboring cnPRTC nodes 11 and an UTC(k) node, the latter again for measuring only.

The UTC(k) time may be inserted via a dedicated glass fiber 21 and/or using a pair of dedicated wave lengths. The UTC(k) time is preferably inserted as a 1 pps signal, a 10 MHz signal, a ToD signal and/or a PTP signal.

Each selected cnPRTC node 10 synchronizes a neighboring cnPRTC node 11, preferably each neighboring cnPRTC node 11, not participating in the method.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 self-synchronizing cnPRTC mesh
10 selected cnPRTC node
100 clock combiner module
1000 time signal
1001 time
1002 phase
1003 frequency
101 UTC(k) insertion function
102 agreement algorithm
103 timescale algorithm 104 coordination function
105 output module
106 measurement and fault detection module
107 GNSS-CV module
108 local time source
1080 PRTC (GNSS)
1081 ePRC
109 remote time source
1091 ePRTC
11 neighboring cnPRTC node
2 UTC(k) node
20 OTT time distribution node
21 glass fiber
3 GNSS system

The invention claimed is:

1. A method for initializing a self-synchronizing coherent network Primary Reference Time Clock (cnPRTC) mesh, comprising:
   initializing a self-synchronizing cnPRTC mesh during a start-up period; and
   setting, by a Universal Time Coordinated (UTC(k)) node connected to a selected cnPRTC node of the self-synchronizing cnPRTC mesh, the selected cnPRTC node to a UTC(k) time provided by the UTC(k) node during the start-up period based on a Global Navigation Satellite System (GNSS) system failing to provide the selected cnPRTC node with a GNSS time during the start-up period;
   wherein setting the selected cnPRTC node comprises directly inserting the UTC(k) time into a clock combiner of the selected cnPRTC node such that the inserted UTC(k) time replaces weighted times provided to the selected cnPRTC node by local time sources and remote time sources.

2. The method according to claim 1, wherein a UTC(k) insertion function of the clock combiner receives the inserted UTC(k) time.

3. The method according to claim 1, wherein the UTC(k) time is inserted via a dedicated glass fiber.

4. The method according to claim 1, wherein the UTC(k) time is inserted using a pair of dedicated wavelengths.

5. The method according to claim 1, wherein the UTC(k) time is inserted as at least one of:
   a 1 pulse per second (pps) signal,
   a 10 MHz signal,
   a time of day (ToD) signal, or
   a Precision Time Protocol (PTP) signal.

6. The method according to claim 1, wherein the self-synchronizing cnPRTC mesh is initialized during a plurality of weeks as the start-up period.

7. The method according to claim 1, wherein the cnPRTC node is selected based on at least one of:
   a spatial distance from the UTC(k) node, or
   an availability of a glass fiber from the UTC(k) node to the selected cnPRTC node.

8. The method according to claim 1, wherein the UTC(k) node sets a plurality of selected cnPRTC nodes of the self-synchronizing cnPRTC mesh to the UTC(k) time.

9. The method according to claim 1, wherein the selected cnPRTC node synchronizes a neighboring cnPRTC node for which the UTC(k) time is not directly provided by the UTC(k) node.

10. A coherent network Primary Reference Time Clock (cnPRTC) node of a self-synchronizing cnPRTC mesh, wherein the self-synchronizing cnPRTC mesh is configured to be initialized during a start-up period, wherein the cnPRTC node comprises:
    an interface configured to receive a Universal Time Coordinated (UTC(k)) time from a UTC(k) node connected to the cnPRTC node during the start-up period based on a Global Navigation Satellite System (GNSS) system failing to provide the cnPRTC node with a GNSS time during the start-up period; and
    a clock combiner configured for direct insertion of the UTC(k) time to replace weighted times provided by local time sources and remote time sources;
    wherein the direct insertion of the UTC(k) time sets the cnPRTC node to the UTC(k) time provided by the UTC(k) node.

11. A self-synchronizing coherent network Primary Reference Time Clock (cnPRTC) mesh, comprising:
    a plurality of cnPRTC nodes, wherein the plurality of cnPRTC nodes comprise the cnPRTC node according to claim 10.

12. A system for initializing a self-synchronizing coherent network Primary Reference Time Clock (cnPRTC) mesh, comprising:
    a cnPRTC node; and
    a Universal Time Coordinated (UTC(k)) node connected to the cnPRTC node;
    wherein the system is configured to initialize the self-synchronizing cnPRTC mesh during a start-up period;
    wherein the UTC(k) node is configured to set the cnPRTC node to a UTC(k) time provided by the UTC(k) node during the start-up period based on a Global Navigation Satellite System (GNSS) system failing to provide the cnPRTC node with a GNSS time during the start-up period; and
    wherein setting the cnPRTC node to the UTC(k) time comprises directly inserting the UTC(k) time into a clock combiner of the cnPRTC node such that the inserted UTC(k) time replaces weighted times provided to the cnPRTC node by local time sources and remote time sources.

13. The system according to claim 12, wherein the UTC(k) node is connected to a plurality of the cnPRTC nodes.

* * * * *